US012692364B2

(12) United States Patent
Sue et al.

(10) Patent No.: US 12,692,364 B2
(45) Date of Patent: Jul. 28, 2026

(54) THERMOPLASTIC AND THERMOSET FOAM NUCLEATION ADDITIVE AND FOAMED MATERIAL

(71) Applicants: FORMOSA PLASTICS CORPORATION, Mailiao Township (TW); The Texas A&M University System, Bryan, TX (US)

(72) Inventors: Hung-Jue Sue, College Station, TX (US); Mingzhen Zhao, College Station, TX (US); Hong-Mao Wu, Mailiao Township (TW); Jen-Long Wu, Mailiao Township (TW); Wen-Hao Kang, Mailiao Township (TW); Kuei-Pin Lin, Mailiao Township (TW); Chiming Hong, Mailiao Township (TW)

(73) Assignees: FORMOSA PLASTICS CORPORATION, Mailiao Township (TW); The Texas A&M University System, Bryan, TX (US)

( * ) Notice: Subject to any disclaimer, the term of this patent is extended or adjusted under 35 U.S.C. 154(b) by 799 days.

(21) Appl. No.: 18/154,545

(22) Filed: Jan. 13, 2023

(65) Prior Publication Data

US 2023/0227626 A1     Jul. 20, 2023

Related U.S. Application Data

(60) Provisional application No. 63/299,629, filed on Jan. 14, 2022.

(30) Foreign Application Priority Data

Dec. 22, 2022    (TW) ................................... 111149357

(51) Int. Cl.
| | |
|---|---|
| *C08K 5/09* | (2006.01) |
| *C08K 3/32* | (2006.01) *C08K 5/56* |
| (2006.01) | *C08L 23/30* |
| (2006.01) | |

(52) U.S. Cl.
CPC .................. *C08K 5/09* (2013.01); *C08K 3/32* (2013.01); *C08K 5/56* (2013.01); *C08L 23/30* (2013.01); *C08K 2003/328* (2013.01)

(58) Field of Classification Search
CPC ........ C08K 2003/328; C08K 2201/011; C08K 3/32; C08K 5/09; C08K 5/56; C08L 23/30
See application file for complete search history.

(56) References Cited

U.S. PATENT DOCUMENTS

| | | | | |
|---|---|---|---|---|
| 2014/0193590 A1* | 7/2014 | Sue | ............................ | C08J 7/06 |
| | | | | 427/427 |
| 2021/0284779 A1 | 9/2021 | Sue et al. | | |

FOREIGN PATENT DOCUMENTS

| | | | | |
|---|---|---|---|---|
| CN | 103897309 A | 7/2014 | | |
| JP | 2021503513 A | 2/2021 | | |
| TW | 202200536 A | 1/2022 | | |
| WO | WO-2021019098 A1 * | 2/2021 | .............. | C08J 5/005 |

OTHER PUBLICATIONS

Kan et al. Inorg Chem. 2016, 55, 5634-5639 (Year: 2016).*

(Continued)

*Primary Examiner* — Danielle M. Carda
*Assistant Examiner* — Jordan W Taylor
(74) *Attorney, Agent, or Firm* — MUNCY, GEISSLER, OLDS & LOWE, P.C.

(57) ABSTRACT

A thermoplastic and thermoset foam nucleation additive, which is added to a foamed material, includes a gas absorbent and a nano-compound, wherein the nano-compound and the gas absorbent are mixed to form the thermoplastic and thermoset foam nucleation additive. The gas absorbent (Continued)

includes a central structure and a short chain structure, wherein a first chemical bond is formed between the short chain structure and the central structure. The nano-compound includes a base structure and a long chain structure, wherein a second chemical bond is formed between the long chain structure and the base structure. A number of carbon atoms in the short chain structure is not less than 8, and a molecular weight of the long chain structure is higher than 10000 g/mole.

10 Claims, 8 Drawing Sheets

(56) References Cited

OTHER PUBLICATIONS

Chen et al. Mat. and Design 2017, 122, 247-254 (Year: 2017).*
Zhao et al., "Preparation of Polyethylene Nanocomposites Based on Polyethylene Grafted Exfoliated a-Zirconium Phosphate", Macromolecules 2022, 55, pp. 3039-3050.
Zhao et al., "Multifunctional polyethylene nanocomposites based on polyethylene-grafted o-zirconium phosphate nanoplatelets", Polymer, 261 (2022) 125422, 9 pgs.
Zhao,, "Synthesis and Structure-Property Relationship of Polyolefin/a-Zirconium Phosphate (ZrP) Nanocomposites", Ph. D Diisertation Defense, Polymer Technology Center, Texas A&M, May 25, 2022, 42 pages.

* cited by examiner

THERMOPLASTIC AND THERMOSET FOAM NUCLEATION ADDITIVE AND FOAMED MATERIAL

RELATED APPLICATIONS

This application claims priority to U.S. Provisional Application Ser. No. 63/299,629, filed Jan. 14, 2022, and Taiwan Application Serial Number 111149357, filed Dec. 22, 2022, which are herein incorporated by references.

BACKGROUND

Technical Field

The present disclosure relates to a foam nucleation additive and a foamed material. More particularly, the present disclosure relates to a thermoplastic and thermoset foam nucleation additive, which can improve the formation of foams, and a foamed material thereof.

Description of Related Art

Thermoplastic foamed materials and thermoset foamed materials are widely used in thermal insulation and sound-proofing. The aforementioned foamed materials all have porous structures to block heat and sound, and to make the materials have sufficient mechanical strength and density. The manufacturing methods of the conventional foamed materials can be divided into physical foaming methods or chemical foaming methods. In the physical foaming methods, a foaming agent (such as carbon dioxide, nitrogen or hydrocarbons) is added into a polymer material before an extrusion molding process. When the polymer material leaves the extrusion molding device, the external pressure drops, and the foaming agent is released therefrom to create a porous structure. The chemical foaming methods are performed by adding specific compounds to trigger specific chemical reactions during the curing process of the polymer material, thereby producing gas and forming the porous structure.

Compared with the chemical foaming methods, the physical foaming methods are with lower pollution and more environmentally friendly, which are the mainstream foaming methods nowadays. Among the physical foamed materials, polyolefin foamed materials prepared by polyolefin polymers with carbon dioxide or nitrogen are the most common materials. However, the polyolefin foamed materials still have many deficiencies. For example, the chemical structures of the polyolefin polymers are mostly linear, which have low melt strength, resulting in poor mechanical properties after foaming. Furthermore, the gas solubility of carbon dioxide and nitrogen in the polyolefin polymers is relatively low and the porous structure thereof is not ideal, which limits the applications of the polyolefin foamed materials.

In this regard, it is a goal for the related industry to prepare a foamed material with excellent mechanical strength and great porous structure.

SUMMARY

According to the present disclosure, a thermoplastic and thermoset foam nucleation additive, which is added to a foamed material, includes a gas absorbent and a nano-compound, wherein the nano-compound and the gas absorbent are mixed to form the thermoplastic and thermoset foam nucleation additive. The gas absorbent includes a central structure and a short chain structure, wherein a first chemical bond is formed between the short chain structure and the central structure. The nano-compound includes a base structure and a long chain structure, wherein a second chemical bond is formed between the long chain structure and the base structure. A number of carbon atoms in the short chain structure is not less than 8, and a molecular weight of the long chain structure is higher than 10000 g/mole.

According to the present disclosure, a thermoplastic and thermoset foam nucleation additive, which is added to a foamed material, includes a gas absorbent. The gas absorbent includes a central structure, a short chain structure and a long chain structure, wherein a first chemical bond is formed between the short chain structure and the central structure, and a second chemical bond is formed between the long chain structure and the central structure. A number of carbon atoms in the short chain structure is not less than 8, and a molecular weight of the long chain structure is higher than 10000 g/mole.

According to the present disclosure, a foamed material includes the aforementioned thermoplastic and thermoset foam nucleation additive and a polymer material. The polymer material includes a thermoplastic polymer or a thermoset polymer, wherein the polymer material is mixed with the thermoplastic and thermoset foam nucleation additive, and the thermoplastic and thermoset foam nucleation additive is configured for facilitating the polymerization and the formation of foams of the polymer material.

BRIEF DESCRIPTION OF THE DRAWINGS

The present disclosure can be more fully understood by reading the following detailed description of the embodiment, with reference made to the accompanying drawings as follows.

DETAILED DESCRIPTION

The present disclosure will be further exemplified by the following specific embodiments. However, the embodiments can be applied to various inventive concepts and can be embodied in various specific ranges. The specific embodiments are only for the purposes of description, and are not limited to these practical details thereof.

In the present disclosure, the compound structure can be represented by a skeleton formula, and the representation can omit carbon atoms, hydrogen atoms and carbon-hydrogen bonds. If the functional groups are clearly identified in a structural formula, the identified structural formula should be followed.

Figure 1A:
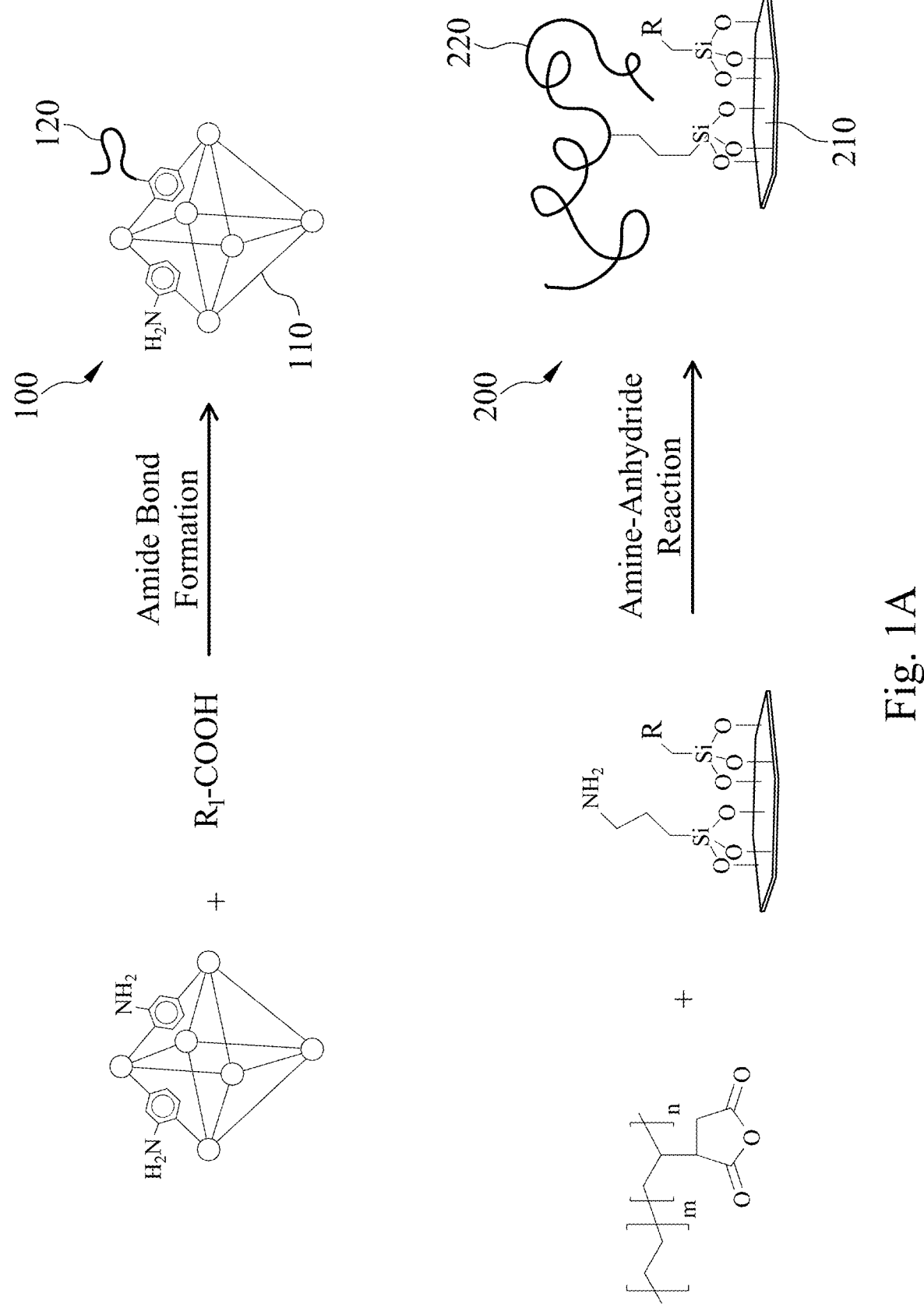
FIG. 1A is a schematic view of a manufacturing process of a thermoplastic and thermoset foam nucleation additive according to the 1st embodiment of the present disclosure.

FIG. 1A is a schematic view of a manufacturing process of a thermoplastic and thermoset foam nucleation additive according to the 1st embodiment of the present disclosure. According to the 1st embodiment of the present disclosure, the thermoplastic and thermoset foam nucleation additive is provided, which is added to a foamed material. The thermoplastic and thermoset foam nucleation additive includes a gas absorbent 100 and a nano-compound 200, wherein the nano-compound 200 and the gas absorbent 100 are mixed to form the thermoplastic and thermoset foam nucleation additive.

In detail, the gas absorbent 100 includes a central structure 110 and a short chain structure 120, wherein a first chemical bond (its number is omitted) is formed between the short chain structure 120 and the central structure 110. In FIG. 1A, for example, the central structure 110 is UiO-66-NH$_2$ (C$_{48}$H$_{34}$N$_6$O$_{32}$Zr$_6$), and the short chain structure 120 is a carbon chain with carboxyl group. Therefore, the amide bond formation happens between the central structure 110 and the short chain structure 120, and the first chemical bond is an amide bond. The gas absorbent 100 is for gas absorption or to store the foaming agent to allow for even distribution of the foaming agent in the matrix of the polymer material.

The central structure 110 is mainly configured for bringing and releasing the gas molecules. Thus, the central structure 110 can be a carbon material, a metal-organic framework (MOF) material or a covalent-organic framework (COF) material. Also, the central structure 110 can be other gas absorbing materials, such as zeolites, molecular sieves or aerogels.

A number of carbon atoms in the short chain structure 120 is not less than 8 to achieve good stability. The number of carbon atoms in the short chain structure 120 can be 8 to 18. A weight ratio between the central structure 110 and the short chain structure 120 can be 1:4 to 1:20. The short chain structure 120 can be a short alkyl chain or any chain structure being polar or nonpolar to achieve stability in the matrix of the polymer material. Because the distribution of the central structure 110 in the polymer material is poor, it is prone to aggregation or sedimentation. The properties of the short chain structure 120 are similar to the properties of the carbon chain of the polymer material, so the short chain structure 120 can be easily dispersed in the polymer material. The short chain structure 120 is miscible, so the stability of the gas absorbent 100 can be achieved. Therefore, by combining the central structure 110 and the short chain structure 120, the distribution of the central structure 110 can be improved, which makes the foamed porous structure more uniform. Moreover, it has been confirmed by the relevant experiments that, when the weight ratio between the central structure 110 and the short chain structure 120 is not less than 1:4, a stable and uniform distribution can be maintained. If the weight ratio thereof is less than 1:4, obvious agglomeration and precipitation will occur.

The nano-compound 200 includes a base structure 210 and a long chain structure 220, wherein a second chemical bond (its number is omitted) is formed between the long chain structure 220 and the base structure 210. In FIG. 1A, for example, the base structure 210 is an exfoliated zirconium phosphate (ZrP) platelet, and the long chain structure 220 is polyethylene-graft-maleic anhydride (PE-MA). Therefore, the amine-anhydride reaction happens between the base structure 210 and the long chain structure 220 to form the second chemical bond. The maleic anhydride in the long chain structure 220 can be 0.2 wt. % to 1.5 wt. %.

Figure 1B:
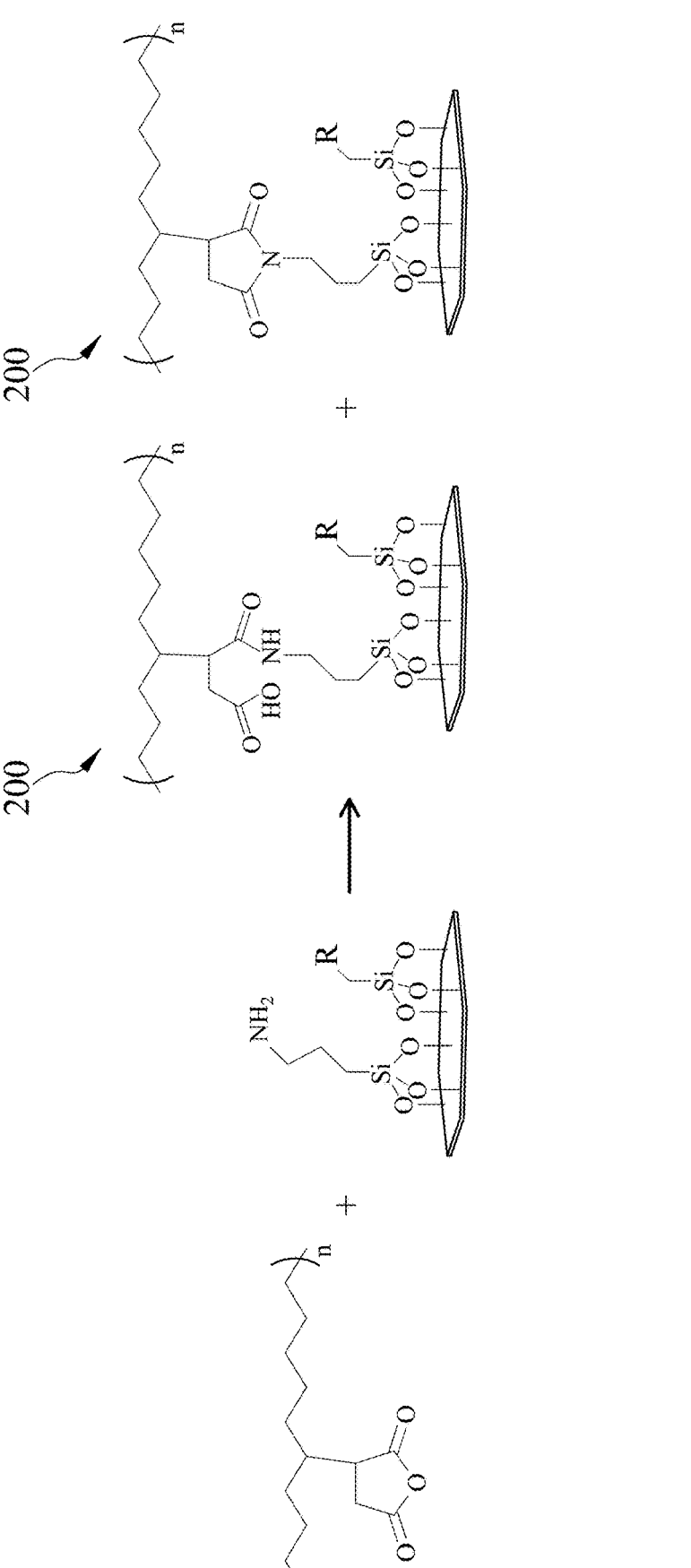
FIG. 1B is a detailed schematic view of synthesizing a nano-compound of FIG. 1A.

FIG. 1B is a detailed schematic view of synthesizing the nano-compound 200 of FIG. 1A. In FIG. 1B, when the exfoliated zirconium phosphate platelet and polyethylene-graft-maleic anhydride undergo the amine-anhydride reaction, the amine groups on the exfoliated zirconium phosphate platelet and the anhydride groups of polyethylene-graft-maleic anhydride can react to form bonds, so as to form amide compounds or imide compounds. Both the amide compounds and the imide compounds can be the nano-compound 200 of the present disclosure, and the specific technical effects can be achieved.

The material properties, such as anti-oxidation, mechanical strength and melt strength, of the polymer material can be improved by the base structure 210. The base structure 210 can be a flake structure, such as an exfoliated graphene platelet, an exfoliated nano-silicon platelet or the exfoliated zirconium phosphate platelet.

A molecular weight of the long chain structure 220 is higher than 10000 g/mole, which enhances entanglement with the matrix of the polymer material. The long chain structure 220 can be a long alkyl chain. The nano-compound 200 with the long chain structure 220 can exert strong interaction with matrix for the nanoparticles to serve as a physical or chemical crosslinking center. The molecular weight of the long chain structure 220 can be 50000 g/mole to 130000 g/mole. A weight ratio between the base structure 210 and the long chain structure 220 can be 1:6 to 1:15. The long chain structure 220 and the carbon chain of the polymer material can be entangled to form a more complex network structure. Therefore, the melt strength and the strain hardening properties of the polymer material can be improved.

Moreover, a total weight of the thermoplastic and thermoset foam nucleation additive is 100%, a weight ratio of the gas absorbent 100 in the thermoplastic and thermoset foam nucleation additive is P1, and the condition is satisfied: 0%<P1≤10%; a weight ratio of the nano-compound 200 in the thermoplastic and thermoset foam nucleation additive is P2, and the condition is satisfied: 0%<P2≤17%. By controlling the ratio of the nano-compound 200 and the gas absorbent 100, it is favorable for the balance between the foaming effect and the mechanical strength of the material.

Figure 2:
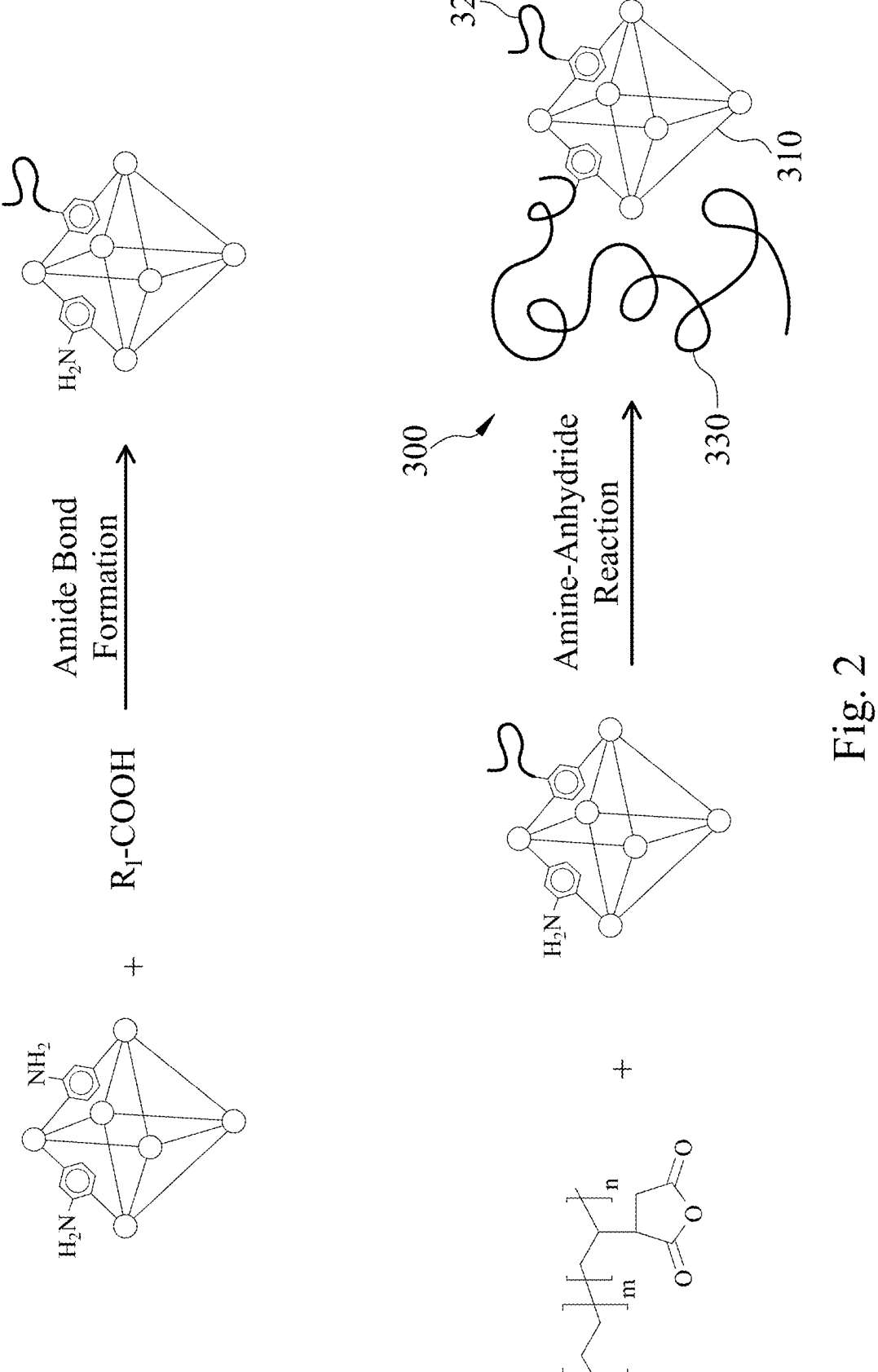
FIG. 2 is a schematic view of a manufacturing process of a thermoplastic and thermoset foam nucleation additive according to the 2nd embodiment of the present disclosure.

FIG. 2 is a schematic view of a manufacturing process of a thermoplastic and thermoset foam nucleation additive according to the 2nd embodiment of the present disclosure. According to the 2nd embodiment of the present disclosure, the thermoplastic and thermoset foam nucleation additive includes a gas absorbent 300. The gas absorbent 300 includes a central structure 310, a short chain structure 320 and a long chain structure 330. The short chain structure 320 and the long chain structure 330 are both connected to the central structure 310. The chemical structures of the central structure 310, the short chain structure 320 and the long chain structure 330 and the connection between the central structure 310 and the short chain structure 320 are the same as the 1st embodiment, and the details will not be given again.

A second chemical bond is formed between the long chain structure 330 and the central structure 310. In FIG. 2, for example, the central structure 310 is UiO-66-NH$_2$, and the long chain structure 330 is polyethylene-graft-maleic anhydride. Therefore, the amine-anhydride reaction happens between the central structure 310 and the long chain structure 330 to form the second chemical bond. A weight ratio between the central structure 310 and the long chain structure 330 can be 1:13. Therefore, the short chain structure 320 and the long chain structure 330 are connected to the single central structure 310 to enhance the gas absorption, as well as improve the distribution of the gas absorbent 300 and the material properties of the polymer material.

According to the present disclosure, a foamed material includes the thermoplastic and thermoset foam nucleation additive of the aforementioned 1st embodiment or 2nd embodiment, and a polymer material. The polymer material includes a thermoplastic polymer or a thermoset polymer, wherein the polymer material is mixed with the thermoplastic and thermoset foam nucleation additive, and the thermoplastic and thermoset foam nucleation additive is configured for facilitating the polymerization and the formation of foams of the polymer material.

The present disclosure will be further exemplified by the following specific embodiments so as to facilitate utilizing and practicing the present disclosure completely by the people skilled in the art without over-interpreting and over-experimenting. However, the readers should understand that the present disclosure should not be limited to these practical details thereof, that is, these practical details are used to describe how to implement the materials and methods of the present disclosure and are not necessary.

1st Example

The thermoplastic and thermoset foam nucleation additive used in the foamed material of the 1st example includes the gas absorbent and the nano-compound. In detail, 0.012 g of UiO-66-NH$_2$ and 0.228 g of stearic acid are added into xylene solvent and react under 25° C. to 130° C. for 1 hour. Then, the gas absorbent is obtained after rinsing. 0.09 g of exfoliated zirconium phosphate platelets and 0.6 g of polyethylene-graft-maleic anhydride with low molecular weight are added into xylene solvent and react under 130° C. for 1 hour to obtain the nano-compound. The ratio of the exfoliated zirconium phosphate platelets in the nano-compound is 13 wt. %.

Next, linear high-density polyethylene (HDPE) is dissolved in xylene solvent and mixed with the aforementioned gas absorbent and nano-compound. The mixture reacts under 130° C. for 10 minutes to form a material to be foamed. Then, the material to be foamed is foamed by the supercritical carbon dioxide (ScCO$_2$) foaming method after drying under 80° C. for 1 hour, in order to obtain the foamed material of the 1st example.

2nd Example

The thermoplastic and thermoset foam nucleation additive used in the foamed material of the 2nd example includes the gas absorbent. In detail, 0.012 g of UiO-66-NH$_2$ and 0.228 g of stearic acid are added into xylene solvent and react under 25° C. to 130° C. for 1 hour. Then, 0.6 g of polyethylene-graft-maleic anhydride with low molecular weight is added and reacts under 25° C. to 130° C. for 1 hour to obtain the gas absorbent.

Next, linear high-density polyethylene is dissolved in xylene solvent and mixed with the aforementioned gas absorbent. The mixture reacts under 130° C. for 10 minutes to form a material to be foamed. Then, the material to be foamed is foamed by the supercritical carbon dioxide foaming method after drying under 80° C. for 1 hour, in order to obtain the foamed material of the 2nd example.

3rd Example

The thermoplastic and thermoset foam nucleation additive used in the foamed material of the 3rd example includes the gas absorbent. In detail, 0.04 g of UiO-66-NH$_2$ and 0.76 g of stearic acid are added into xylene solvent and react under 25° C. to 130° C. for 1 hour. Then, 1 g of polyethylene-graft-maleic anhydride with low molecular weight is added and reacts under 25° C. to 130° C. for 1 hour to obtain the gas absorbent.

Next, 10 g of linear high-density polyethylene is dissolved in xylene solvent and mixed with the aforementioned gas absorbent. The mixture reacts under 130° C. for 10 minutes to form a material to be foamed. Then, the material to be foamed is foamed by the supercritical nitrogen (ScN$_2$) foaming method after drying under 80° C. for 1 hour, in order to obtain the foamed material of the 3rd example.

4th Example

The thermoplastic and thermoset foam nucleation additive used in the foamed material of the 4th example includes the gas absorbent. In detail, 0.04 g of UiO-66-NH$_2$ and 0.76 g of stearic acid are added into xylene solvent and react under 25° C. to 130° C. for 1 hour. Then, 1 g of polyethylene-graft-maleic anhydride with high molecular weight is added and reacts under 25° C. to 130° C. for 1 hour to obtain the gas absorbent.

Next, 10 g of linear high-density polyethylene is dissolved in xylene solvent and mixed with the aforementioned gas absorbent. The mixture reacts under 130° C. for 10 minutes to form a material to be foamed. Then, the material to be foamed is foamed by the supercritical nitrogen foaming method after drying under 80° C. for 1 hour, in order to obtain the foamed material of the 4th example.

It should be explained that, although the central structures of the gas absorbents of the 1st example to the 4th example in the present disclosure are all porous compounds, in practical applications, other materials with gas absorbing ability, which are able to bond to the short chain structures, can be used as the central structures of the gas absorbents. Thus, the present disclosure is not limited to the aforementioned materials.

1st Comparative Example

The foamed material of the 1st comparative example does not include the thermoplastic and thermoset foam nucleation additive of the present disclosure. Briefly, 3 wt. % of talcum powder is added into the purified linear high-density polyethylene as the foam nucleation additive, which is foamed into the foamed material of the 1st comparative example by the supercritical carbon dioxide foaming method or the supercritical nitrogen foaming method.

2nd Comparative Example

The foamed material of the 2nd comparative example does not include the thermoplastic and thermoset foam nucleation additive of the present disclosure. Briefly, the foamed material of the 2nd comparative example is obtained by foaming the purified long-branched high-density polyethylene by the supercritical carbon dioxide foaming method.

3rd Comparative Example

The foam nucleation additive used in the foamed material of the 3rd comparative example only includes the nano-compound. In detail, 0.09 g of exfoliated zirconium phosphate platelets and 0.6 g of polyethylene-graft-maleic anhydride with high molecular weight are added into xylene solvent and react under 130° C. for 1 hour to obtain the nano-compound. The ratio of the exfoliated zirconium phosphate platelets in the nano-compound is 13 wt. %.

Next, linear high-density polyethylene is dissolved in xylene solvent and mixed with the aforementioned nano-compound. The mixture reacts under 130° C. for 10 minutes to form a material to be foamed. Then, the material to be foamed is foamed by the supercritical carbon dioxide foaming method after drying under 80° C. for 1 hour, in order to obtain the foamed material of the 3rd comparative example.

4th Comparative Example

The foamed material of the 4th comparative example does not include the thermoplastic and thermoset foam nucleation additive of the present disclosure. Briefly, 3 wt. % of talcum powder is added into the purified linear high-density polyethylene as the foam nucleation additive, and 10 wt. % of polyethylene-graft-maleic anhydride with low molecular weight is also added. Then, the foamed material of the 4th comparative example is made by the supercritical nitrogen foaming method.

5th Comparative Example

The foamed material of the 5th comparative example does not include the thermoplastic and thermoset foam nucleation additive of the present disclosure. Briefly, 3 wt. % of talcum powder is added into the purified linear high-density polyethylene as the foam nucleation additive, and 10 wt. % of polyethylene-graft-maleic anhydride with low molecular weight is also added. Then, the foamed material of the 5th comparative example is made by the supercritical nitrogen foaming method.

The long-branched high-density polyethylene in the aforementioned examples and comparative examples is the high-density polyethylene including long branched structures, which can bring obvious strain hardening properties. Furthermore, the material properties related to the high-density polyethylene and polyethylene-graft-maleic anhydride are listed in Table 1 below.

TABLE 1

| | Melting Point (° C.) | Molecular Weight (g/mol) | Molecular Weight Distribution | Content of Maleic Anhydride (wt. %) |
|---|---|---|---|---|
| Linear high-density polyethylene | 134 | 75,000 | 5 | N/A |
| Long-branched high-density polyethylene | 129 | 90,000 | 8.62 | N/A |
| Polyethylene-graft-maleic anhydride with low molecular weight | 127 | 49,900 | 4.07 | 1.5 |
| Polyethylene-graft-maleic anhydride with high molecular weight | 133 | 130,600 | 5.32 | 0.2 |

Besides, the process of the aforementioned supercritical carbon dioxide foaming method and the supercritical nitrogen foaming method is as follows. First, the material to be foamed, which is made by granulation and cutting, is put into the impregnation cup for later use. The gas used for foaming is heated up to 100° C. to 170° C. and pressurized to 130 kg/cm$^2$ to make the gas change into a supercritical state. Then, a tank is heated, and the impregnation cup with the material to be foamed is put into the tank after the tank reaches the target temperature. Then, the tank is closed and the supercritical gas is put into the tank. When the pressure in the tank reaches 60 kg/cm$^2$ to 100 kg/cm$^2$, the tank is remained for about 30 minutes to 120 minutes. Finally, when it is impregnated for a required time, the pressure of the tank is quickly reduced and the time for reducing pressure can be less than 0.3 seconds. The foamed material in the impregnation cup is taken out and placed in an ice-water bath for hardening and cooling. The following experiments are performed after the foamed material is dry.

<Comparison of Porous Structure>

Figure 3B:
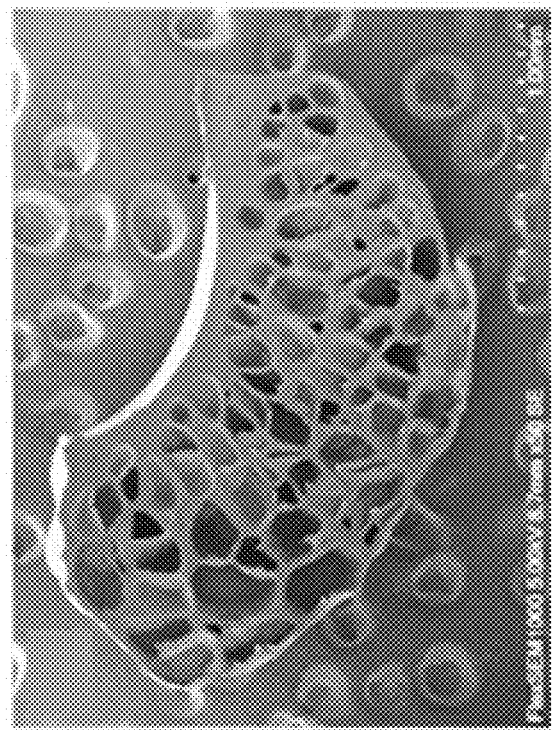
FIG. 3B is a cross-sectional microscope image of a foamed material of the 3rd comparative example made by the supercritical carbon dioxide foaming method.
Figure 3A:
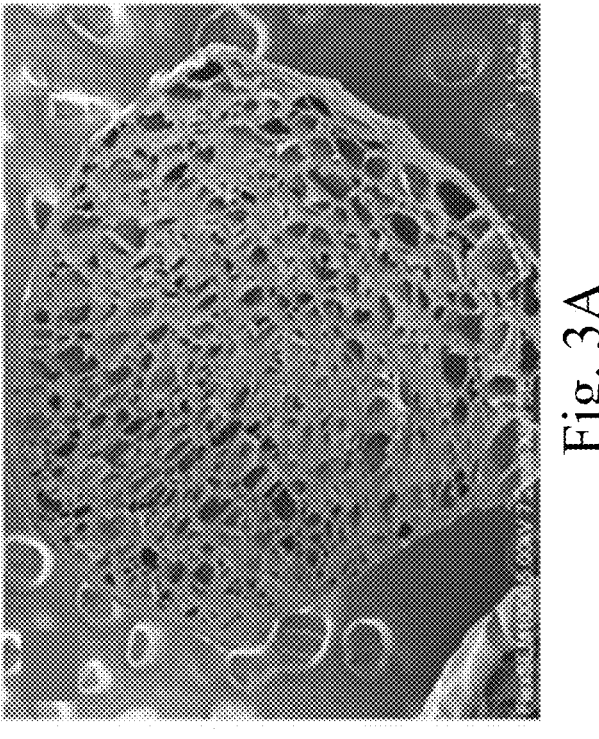
FIG. 3A is a cross-sectional microscope image of a foamed material of the 1st comparative example made by the supercritical carbon dioxide foaming method.

FIG. 3A is a cross-sectional microscope image of a foamed material of the 1st comparative example made by the supercritical carbon dioxide foaming method. FIG. 3B is a cross-sectional microscope image of a foamed material of the 3rd comparative example made by the supercritical carbon dioxide foaming method. In FIG. 3A, the structure of the foamed material of the 1st comparative example is poor and the pore sizes are inconsistent. The foaming effect near the center of the foamed material is poor, resulting in a negative impact on the overall structural strength of the foamed material. In FIG. 3B, although the porous structure of the foamed material can be improved by adding the nano-compound, there is still a significant difference between the sizes of different pores, and the foaming effect on one side of the foamed material is poor. Therefore, there is still a limitation for the nano-compound to improve the foaming effect.

Figure 3C:
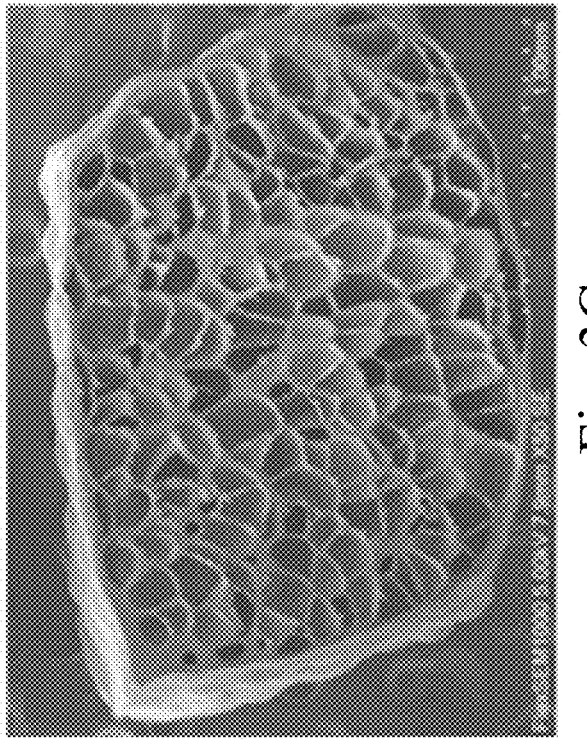
FIG. 3C is a cross-sectional microscope image of a foamed material of the 1st example made by the supercritical carbon dioxide foaming method.

FIG. 3C is a cross-sectional microscope image of a foamed material of the 1st example made by the supercritical carbon dioxide foaming method. In FIG. 3C, after adding the gas absorbent and the nano-compound, more gas can be carried by the gas absorbent, the gas absorbent can be evenly dispersed in the high-density polyethylene, and the chemical structure of high-density polyethylene can be improved by the nano-compound. Therefore, the pores inside the foamed material are evenly distributed, and the pore sizes are similar, which proves that the foaming effect is more consistent and it is favorable for improving the mechanical strength of the foamed material.

Figure 4C:
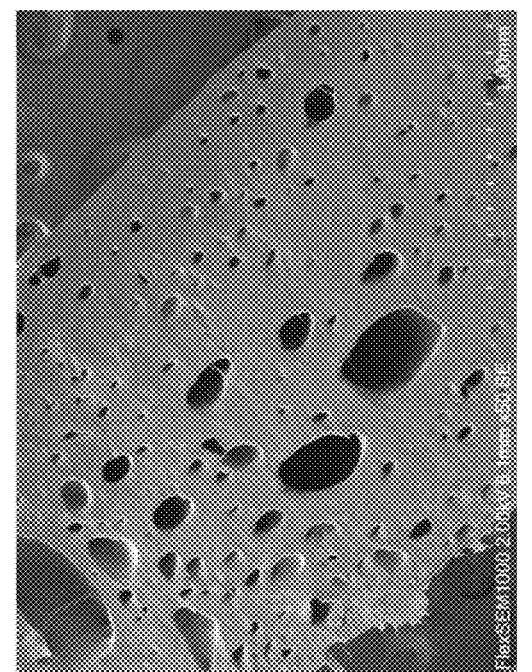
FIG. 4C is a cross-sectional microscope image of a foamed material of the 5th comparative example made by the supercritical nitrogen foaming method.
Figure 4A:
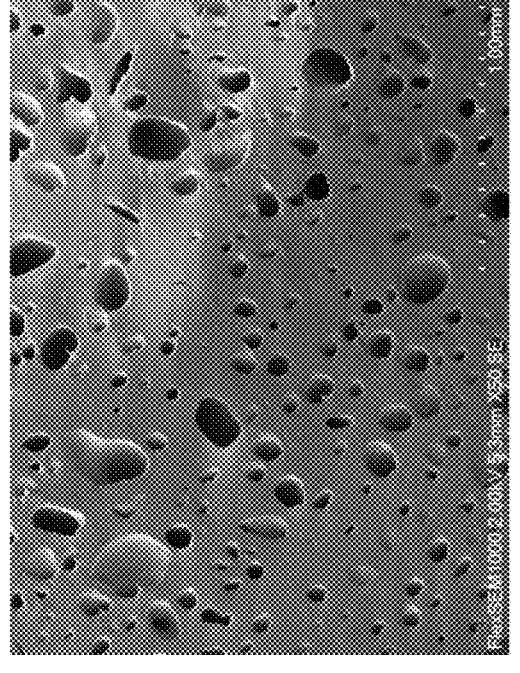
FIG. 4A is a cross-sectional microscope image of a foamed material of the 1st comparative example made by the supercritical nitrogen foaming method.
Figure 4B:
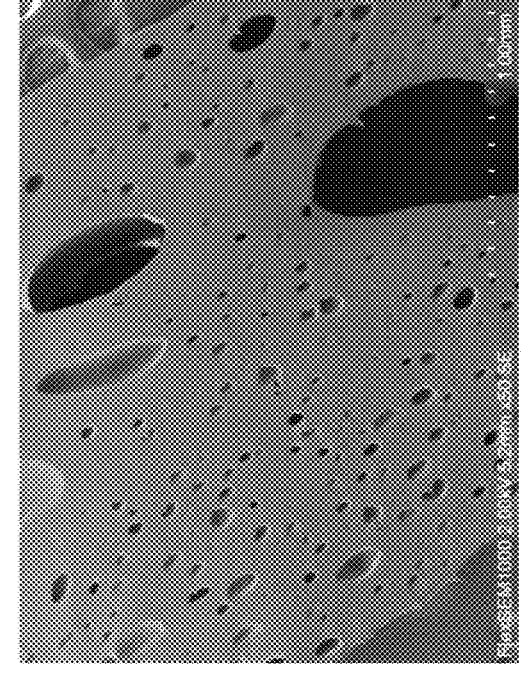
FIG. 4B is a cross-sectional microscope image of a foamed material of the 4th comparative example made by the supercritical nitrogen foaming method.

FIG. 4A is a cross-sectional microscope image of a foamed material of the 1st comparative example made by the supercritical nitrogen foaming method. FIG. 4B is a cross-sectional microscope image of a foamed material of the 4th comparative example made by the supercritical nitrogen foaming method. FIG. 4C is a cross-sectional microscope image of a foamed material of the 5th comparative example made by the supercritical nitrogen foaming method. In FIG. 4A, the foaming effect of the 1st comparative example is poor. In FIG. 4B and FIG. 4C, the foaming results of the 4th comparative example and the 5th comparative example are similar to the 1st comparative example, which performs poor foaming results.

Figure 4E:
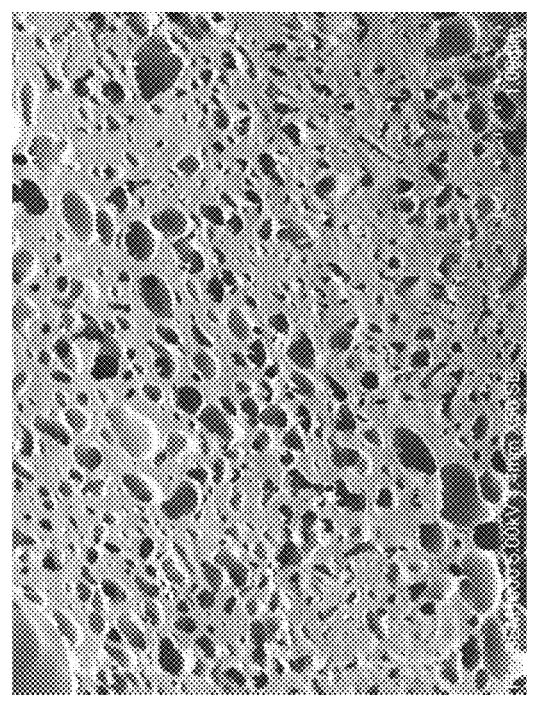
FIG. 4E is a cross-sectional microscope image of a foamed material of the 4th example made by the supercritical nitrogen foaming method.
Figure 4D:
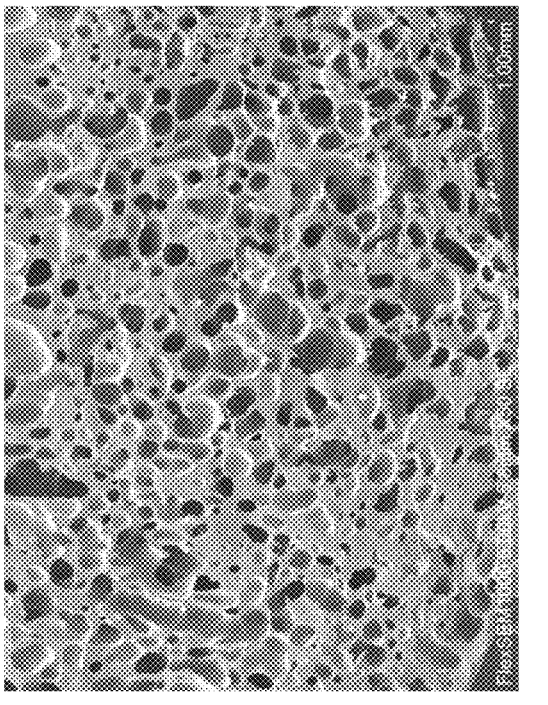
FIG. 4D is a cross-sectional microscope image of a foamed material of the 3rd example made by the supercritical nitrogen foaming method.

FIG. 4D is a cross-sectional microscope image of a foamed material of the 3rd example made by the supercritical nitrogen foaming method. FIG. 4E is a cross-sectional microscope image of a foamed material of the 4th example made by the supercritical nitrogen foaming method. In FIG. 4D and FIG. 4E, after adding the thermoplastic and thermoset foam nucleation additive into the linear high-density polyethylene, the absorption of supercritical nitrogen can be increased. Also, sufficient melt strength can be obtained by using polyethylene-graft-maleic anhydride. Therefore, the porous structure, which is better than the aforementioned comparative examples, can be manufactured after the supercritical nitrogen is released and the physical foaming reaction is performed.

Furthermore, in FIG. 3C, FIG. 4D and FIG. 4E, both the foamed material made by the supercritical nitrogen foaming method and the foamed material made by the supercritical carbon dioxide foaming method have dense porous structure. It shows that, no matter what kind of gas is used for foaming, the thermoplastic and thermoset foam nucleation additive of the present disclosure can improve the foaming effect of the foamed material and has a pretty wide application.

<Comparison of Elongation Viscosity>

Figure 5:
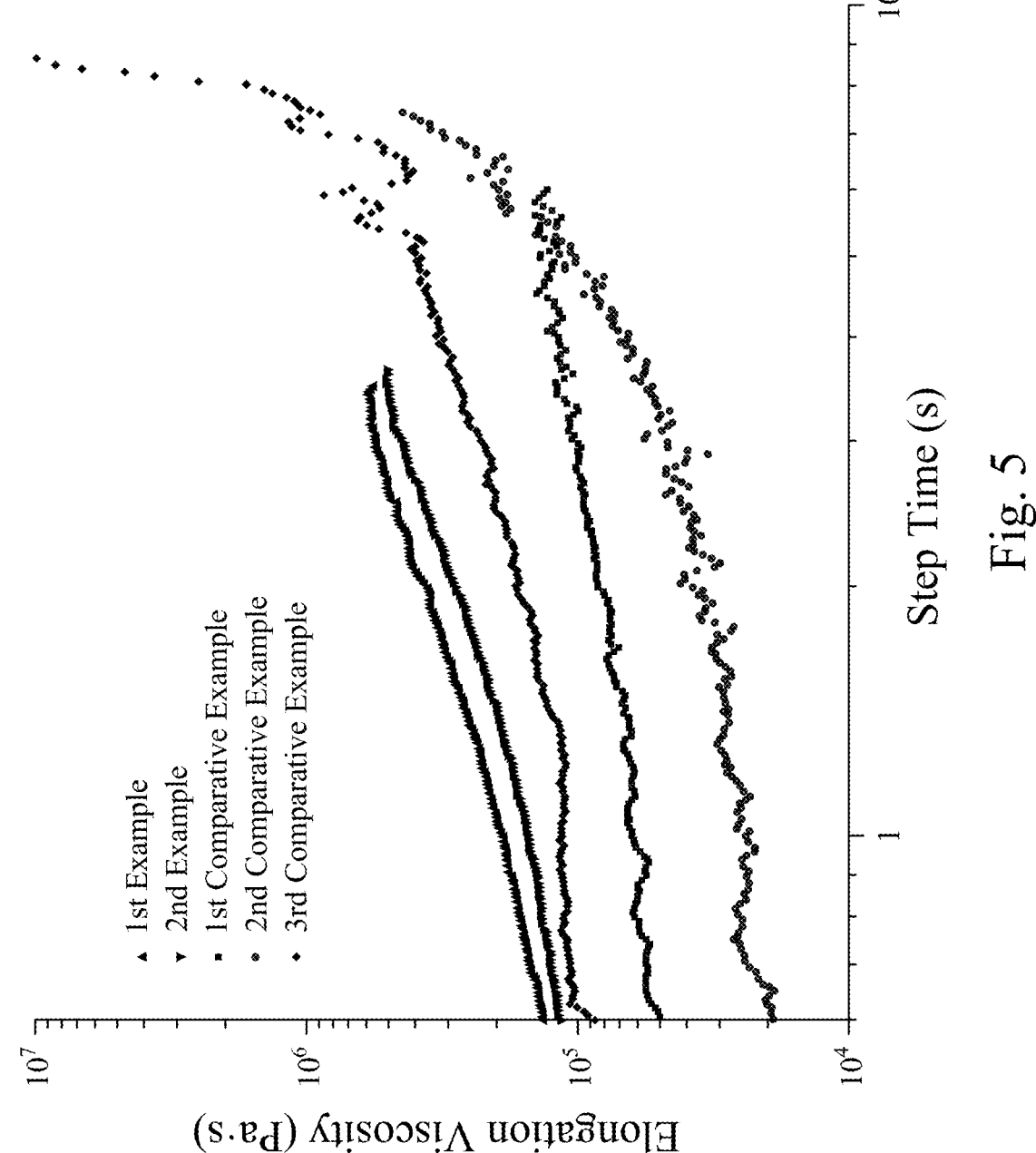
FIG. 5 is an elongation viscosity diagram of the 1st comparative example to the 3rd comparative example, the 1st example and the 2nd example.

FIG. 5 is an elongation viscosity diagram of the 1st comparative example to the 3rd comparative example, the 1st example and the 2nd example. In FIG. 5, the elongation viscosity of the foamed material of the 1st comparative example is significantly lower. The elongation viscosity of the foamed material of the 2nd comparative example in the long step time is improved because the high-density polyethylene with long-branched structure is used. The strain hardening properties of the 2nd comparative example are better than the 1st comparative example. However, the overall elongation viscosity of the foamed material of the 2nd comparative example is still insufficient.

The elongation viscosity of the foamed material of the 3rd comparative example is slightly enhanced by adding the nano-compound. The nano-compound in the 3rd comparative example is modified by the polyethylene-graft-maleic anhydride with high molecular weight. The polyethylene-graft-maleic anhydride with high molecular weight helps the foamed material to improve the strain hardening properties. However, the overall elongation viscosity of the foamed material of the 3rd comparative example is still insufficient.

In comparison, the elongation viscosities of the foamed materials of the 1st example and the 2nd example are significantly enhanced because the gas absorbent is used. In the foaming process, higher elongation viscosity can prevent the pores from breaking due to the insufficient toughness. Therefore, the stability of the porous structure can be improved, and the mechanical strength of the foamed materials can be enhanced. Moreover, the thermoplastic and thermoset foam nucleation additives of the 1st example and the 2nd example use the polyethylene-graft-maleic anhydride with low molecular weight, which can improve the strain hardening properties of the foamed materials, but the improvement is not significant. The gas absorbent and the nano-compound of the 1st example and the 2nd example can be modified by the polyethylene-graft-maleic anhydride with high molecular weight. The strain hardening properties of the foamed materials can be further improved, and better material properties can be obtained.

In this regard, the thermoplastic and thermoset foam nucleation additive of the present disclosure uses the gas absorbent, and the solubility of gas in the polymer material can be significantly enhanced. The short chain structure further helps the gas absorbent to disperse in the polymer material, which is favorable for forming a uniform and dense porous structure. Moreover, the melt strength and the strain hardening properties of the polymer material can be improved by the long chain structure on the nano-compound, and the mechanical properties of the foamed material are further improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A thermoplastic and thermoset foam nucleation additive, which is added to a foamed material, wherein the thermoplastic and thermoset foam nucleation additive comprises:

a gas absorbent, comprising:

a central structure; and a short chain structure, wherein a first chemical bond is formed between the short chain structure and the central structure; and a nano-compound, comprising:

a base structure; and a long chain structure, wherein a second chemical bond is formed between the long chain structure and the base structure;

wherein the nano-compound and the gas absorbent are mixed to form the thermoplastic and thermoset foam nucleation additive, a number of carbon atoms in the short chain structure is not less than 8, and a molecular weight of the long chain structure is higher than 10000 g/mol.

2. The thermoplastic and thermoset foam nucleation additive of claim 1, wherein the central structure is a carbon material, a metal-organic framework material or a covalent-organic framework material.

3. The thermoplastic and thermoset foam nucleation additive of claim 1, wherein the first chemical bond is an amide bond.

4. The thermoplastic and thermoset foam nucleation additive of claim 1, wherein the base structure is an exfoliated graphene platelet, an exfoliated nano-silicon platelet or an exfoliated zirconium phosphate platelet.

5. The thermoplastic and thermoset foam nucleation additive of claim 1, wherein the second chemical bond is formed by an amine-anhydride reaction between the long chain structure and the base structure.

6. The thermoplastic and thermoset foam nucleation additive of claim 1, wherein a total weight of the thermoplastic and thermoset foam nucleation additive is 100%, a weight ratio of the gas absorbent in the thermoplastic and thermoset foam nucleation additive is P1, and the condition is satisfied: 0%<P1≤10%.

7. The thermoplastic and thermoset foam nucleation additive of claim 1, wherein a total weight of the thermoplastic and thermoset foam nucleation additive is 100%, a weight ratio of the nano-compound in the thermoplastic and thermoset foam nucleation additive is P2, and the condition is satisfied: 0%<P2≤17%.

8. The thermoplastic and thermoset foam nucleation additive of claim 1, wherein a weight ratio between the central structure and the short chain structure is 1:4 to 1:20.

9. The thermoplastic and thermoset foam nucleation additive of claim 1, wherein a weight ratio between the base structure and the long chain structure is 1:6 to 1:15.

10. A foamed material, comprising:

the thermoplastic and thermoset foam nucleation additive of claim 1; and a polymer material comprising a thermoplastic polymer or a thermoset polymer, wherein the polymer material is mixed with the thermoplastic and thermoset foam nucleation additive, and the thermoplastic and thermoset foam nucleation additive is configured for facilitating the polymerization and the formation of foams of the polymer material.

\* \* \* \* \*